United States Patent
Park et al.

(10) Patent No.: US 8,245,258 B2
(45) Date of Patent: Aug. 14, 2012

(54) METHOD FOR PROVIDING VIDEO TELEPHONY USING BROADCAST RECEIVING APPARATUS

(75) Inventors: Ji-hyun Park, Seoul (KR); Ji-eun Kim, Yongin-si (KR); Sung-baik Jo, Suwon-si (KR); Il-kwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 12/099,473

(22) Filed: Apr. 8, 2008

(65) Prior Publication Data

US 2009/0119725 A1    May 7, 2009

(30) Foreign Application Priority Data

Nov. 5, 2007 (KR) .......................... 10-2007-112363

(51) Int. Cl.
*H04N 7/173* (2011.01)
(52) U.S. Cl. ............................. 725/80; 725/83; 348/734
(58) Field of Classification Search ............... 725/78–85, 725/131–134, 139–142, 151–153; 348/734
See application file for complete search history.

(56) References Cited

U.S. PATENT DOCUMENTS

| | | | | |
|---|---|---|---|---|
| 6,081,263 | A * | 6/2000 | LeGall et al. | 715/760 |
| 6,177,931 | B1 * | 1/2001 | Alexander et al. | 725/52 |
| 6,591,423 | B1 * | 7/2003 | Campbell | 725/119 |
| 6,882,299 | B1 * | 4/2005 | Allport | 341/176 |
| 7,395,546 | B1 * | 7/2008 | Asmussen | 725/34 |
| 7,653,926 | B2 * | 1/2010 | Stefanik | 725/58 |
| 7,690,017 | B2 * | 3/2010 | Stecyk et al. | 725/80 |
| 7,930,721 | B1 * | 4/2011 | Hernes | 725/78 |
| 2003/0070177 | A1 * | 4/2003 | Kondo et al. | 725/106 |

\* cited by examiner

*Primary Examiner* — Annan Shang
(74) *Attorney, Agent, or Firm* — Sughrue Mion, PLLC (57) ABSTRACT

A method for providing video telephony is presented. By the method, a telephone directory of a broadcast receiving apparatus can be updated by receiving a telephone directory of a connected external device is provided. A call request signal can be transmitted to an information communication terminal of the user of an external broadcast receiving apparatus when the external broadcast receiving apparatus is turned off. A video telephony mode can change according to whether or not audio signals are transmitted and received when video telephony is connected. The volume of a plurality of windows can each be adjusted separately. As a result, users can utilize video telephony more conveniently.

11 Claims, 11 Drawing Sheets

<VIDEO TELEPHONY ACTIVE MODE>   <VIDEO TELEPHONY STAND-BY MODE>

FIG. 12

METHOD FOR PROVIDING VIDEO TELEPHONY USING BROADCAST RECEIVING APPARATUS

CROSS-REFERENCE TO RELATED APPLICATIONS

This application claims priority under 35 U.S.C. §119 from Korean Patent Application No. 10-2007-0112363, filed on Nov. 5, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing video telephony and more particularly, to providing video telephony using a broadcast receiving apparatus such as a television.

2. Description of the Related Art

As electronic technology has developed, multifunctional electronic devices providing convenience and functionality have appeared on the market. In particular, with development in network infrastructure and Internet, electronic devices having an Internet function such as Internet-connectable televisions (TV), refrigerators, and microwave ovens have become widespread.

Among such multifunctional electronics, Internet-connectable TVs have been already released on the market. Moreover, TVs are basically display media, and TVs having a video telephony function and an image input function have also been introduced.

Accordingly, users can use the large screen of such a TV for video telephony.

However, a user may have trouble inputting telephone numbers when using the TV for video telephony.

In addition, it may be impossible to carry out video telephony when the TV is turned off.

Furthermore, when a user carries out video telephony while watching the TV, the user may find it difficult to concentrate on video telephony due to the TV sounds.

Therefore, there is a need for methods whereby the user may use video telephony with greater ease and convenience.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a video telephony method for updating a telephone directory of a broadcast receiving apparatus by receiving a telephone directory from a connected external device so that users can utilize video telephony more conveniently.

Another aspect of the present invention provides a video telephony method for transmitting a call request signal to an information communication terminal of the user of an external broadcast receiving apparatus when the external broadcast receiving apparatus is turned off.

Yet another aspect of the present invention provides a video telephony method for changing a video telephony mode according to whether or not audio signals are transmitted and received when video telephony is initiated.

Yet another aspect of the present invention provides a video telephony method for collectively minimizing a plurality of windows according to a command received from an input unit to collectively minimize the plurality of windows.

Yet another aspect of the present invention provides a video telephony method wherein the volume of each of a plurality of windows may be individually adjusted.

According to an exemplary aspect of the present invention, there is provided a method for providing video telephony using a broadcast receiving apparatus, the method including receiving a telephone directory from an external device connected to the broadcast receiving apparatus, and updating a telephone directory of the broadcast receiving apparatus by comparing the received telephone directory with the telephone directory of the broadcast receiving apparatus.

In the updating operation, if the received telephone directory is different from the telephone directory of the broadcast receiving apparatus, the telephone directory of the broadcast receiving apparatus may be updated by changing the telephone directory of the broadcast receiving apparatus based on the received telephone directory.

The external device may be a mobile phone, and the broadcast receiving apparatus may be a television.

According to another exemplary aspect of the present invention, there is provided a method for providing video telephony using a broadcast receiving apparatus, the method including determining a video telephony mode of an external broadcast receiving apparatus, and transmitting a call request signal to an information communication terminal of a user of the external broadcast receiving apparatus if the external broadcast receiving apparatus is turned off.

The information communication terminal may be a mobile phone, and wherein in the transmitting operation, if the external broadcast receiving apparatus is turned off, the call request signal or a short message service (SMS) message indicating there is a call request is transmitted to the information communication terminal of the user of the external broadcast receiving apparatus.

According to another exemplary aspect of the present invention, there is provided a method for providing video telephony using a broadcast receiving apparatus, the method including determining whether or not audio signals are transmitted and received during video telephony, and changing a video telephony mode according to whether or not audio signals are transmitted and received.

In the changing operation, if audio signals are not transmitted or received for a period of time, the video telephony mode may be changed to a video telephony stand-by mode.

In the video telephony stand-by mode, windows connected with video telephony may be reduced or become transparent.

In the video telephony stand-by mode, the volume of calls connected with video telephony may be reduced.

In the changing operation, if transmission and reception of the audio signal are restored, the video telephony mode may be changed back to a video telephony active mode.

According to another exemplary aspect of the present invention, there is provided a method for providing video telephony using a broadcast receiving apparatus, the method including receiving a user command to collectively minimize a plurality of windows displayed on a screen of the broadcast receiving apparatus from an input unit of the broadcast receiving apparatus, and minimizing the plurality of windows collectively according to the received user command.

The plurality of windows may be windows for video telephony.

According to another exemplary aspect of the present invention, there is provided a method for providing video telephony using a broadcast receiving apparatus, the method including displaying a plurality of windows, and adjusting the volume of the plurality of windows separately.

The plurality of windows may include a window for broadcast program, and a window for video telephony, and wherein the adjusting operation comprises adjusting the volume of the window for broadcast program and the window for video telephony separately.

The plurality of windows may include a plurality of windows for video telephony, and wherein the adjusting operation comprises adjusting each of the windows for video telephony.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1:
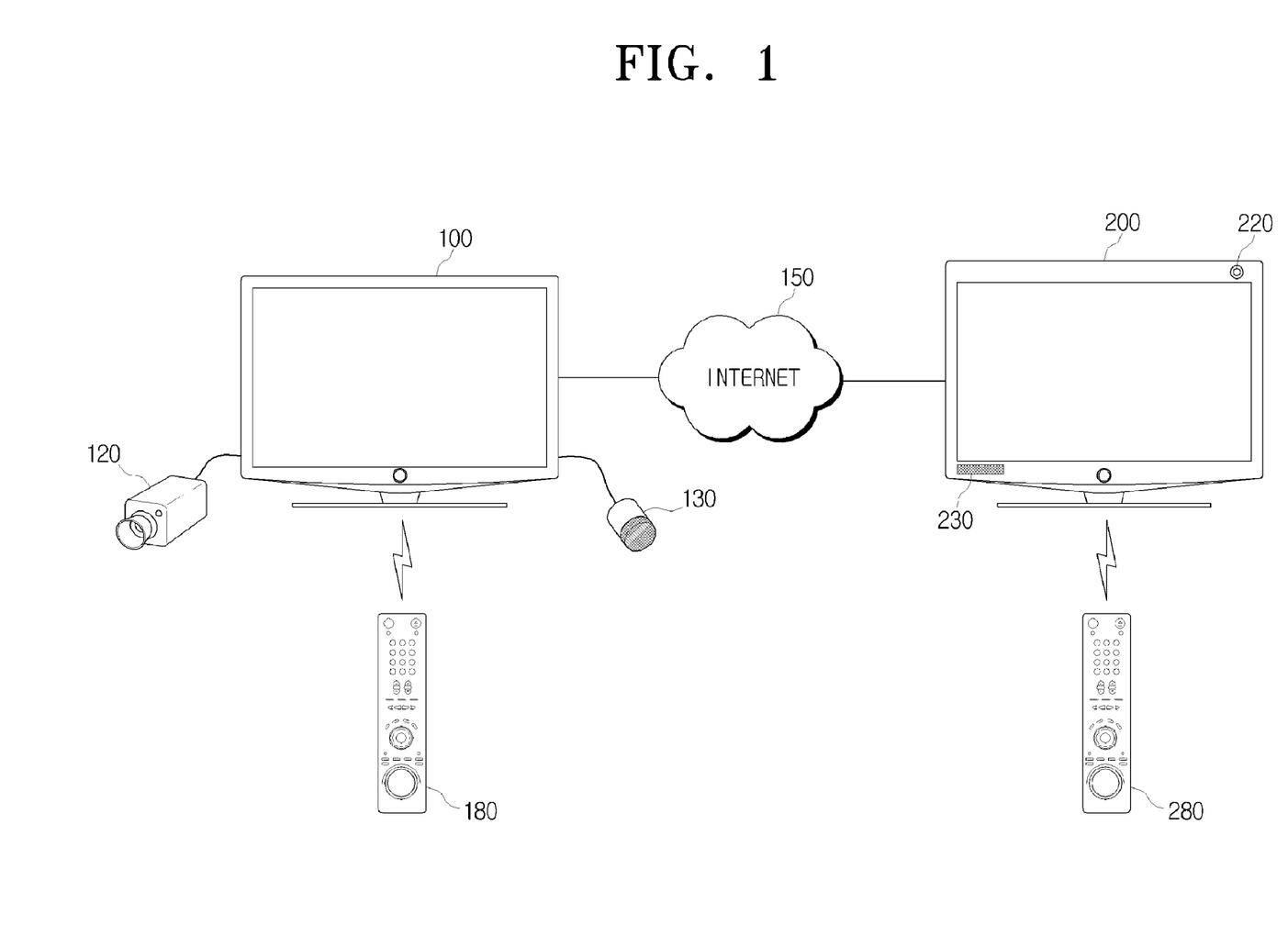
FIG. 1 is a schematic perspective view of a transmitting TV and a receiving TV used in video telephony according to an exemplary embodiment of the present invention.

FIG. 1 is a schematic perspective view of a receiving TV 100 and a transmitting TV 200 used in video telephony according to an exemplary embodiment of the present invention. As shown in FIG. 1, the receiving TV 100 and the transmitting TV 200 are connected over the Internet 150.

The receiving TV 100 is connected to an external video capturing unit 120 and an external microphone 130. The receiving TV 100 is controlled by a user through a remote control 180.

The transmitting TV 200 embeds a video capturing unit 220 and a microphone 230. The transmitting TV 200 is controlled by the user through a remote control 280.

The transmitting TV 200 may also be externally connected to the video capturing unit 220 and the microphone 230. In addition, the microphone 230 may be concealed within the transmitting TV 200 in usual situations, and appear externally when the user uses video telephony.

The transmitting TV 200 and the receiving TV 100 are connected over the Internet 150 so that video telephony can be performed.

The microphones 130 and 230 are used for audio telephony between the transmitting TV 200 and the receiving TV 100. The video capturing units 120 and 220 and the microphones 130 and 230 are used for video telephony between the transmitting TV 200 and the receiving TV 100.

The transmitting TV 200 transmits a call request signal to the receiving TV 100. If the receiving TV 100 accepts the request, the transmitting TV 200 and the receiving TV 100 perform video telephony.

Video telephony between the transmitting TV 200 and the receiving TV 100 is provided through the Internet 150. Accordingly, a server for video telephony is provided by a video telephony providing company on the Internet 150. For example, when audio telephony or video telephony between the transmitting TV 200 and the receiving TV 100 is performed using an Internet phone, a server for providing Internet phone service using Voice over Internet Protocol (VoIP) or Multimedia over Internet Protocol (MoIP) on the Internet is needed.

As described above, communication between the transmitting TV 200 and the receiving TV 100 is enabled using the server of the phone service providing company. Furthermore, the transmitting TV 200 and the receiving TV 100 can each receive phone numbers from the phone service providing company.

Figure 2:
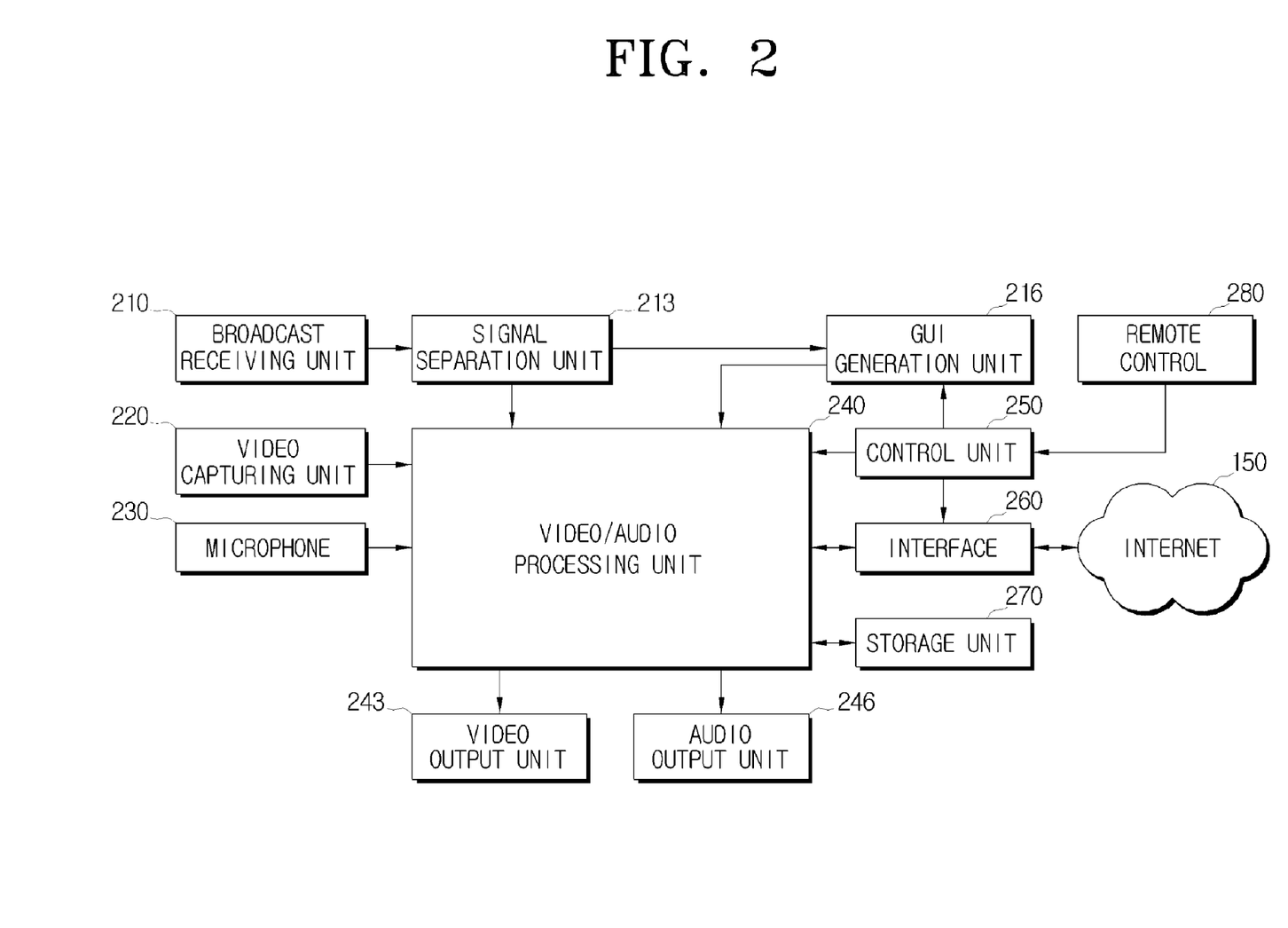
FIG. 2 is a detailed block diagram of a TV according to an exemplary embodiment of the present invention.

The configuration of the transmitting TV 200 (referred to hereinafter as TV 200) is described below in detail with reference to FIG. 2. FIG. 2 is a detailed block diagram of the TV 200 according to an exemplary embodiment of the present invention.

The TV 200 includes a broadcast receiving unit 210, a signal separation unit 213, a graphical user interface (GUI) generation unit 216, a video capturing unit 220, a microphone 230, a video/audio processing unit 240, a video output unit 243, an audio output unit 246, a control unit 250, an interface 260, a storage unit 270, and a remote control 280.

The broadcast receiving unit 210 receives and demodulates broadcasts transmitted wiredly or wirelessly from broadcast stations or satellites.

The signal separation unit 213 separates a video signal, an audio signal, and an additional information signal from a received broadcast signal. The additional information may include electronic program guide (EPG). The signal separation unit 213 transmits the video and audio signals to the video/audio processing unit 240, and transmits the additional information signal to the GUI generation unit 216.

The GUI generation unit 216 generates a GUI to be provided to the user. For example, the GUI generation unit 216 generates a GUI to be displayed as an EPG with the received additional information, and transmits the GUI to the video/audio processing unit 240.

The video capturing unit 220 captures video of the user, and transmits the captured video to the video/audio processing unit 240. The captured video may be transmitted and displayed through the video output unit 243, or stored in the storage unit 270. Moreover, during video telephony, the captured video may be transmitted to the receiving TV 100 through the interface 260.

The microphone 230 receives input of the voice of the user, and transmits the input voice to the video/audio processing unit 240. The input voice may be output through the audio output unit 246 and provided for a user as sound using a speaker, or may be stored in the storage unit 270. In addition, during audio telephony or video telephony, the input voice may be transmitted to the receiving TV 100 through the interface 260.

The video/audio processing unit 240 processes video signals and audio signals input from the signal separation unit 213, GUI generation unit 216, video capturing unit 220, and microphone 230, that is, performs video decoding, video scaling, and audio decoding. In addition, the video/audio processing unit 240 adds a GUI generated by the GUI generation unit 216 to captured video.

The video/audio processing unit 240 outputs video signals to the video output unit 243, and outputs audio signals to the audio output unit 246.

When the video signals and audio signals are stored in the storage unit 270 or transmitted to the receiving TV 100 through the interface 260, the video/audio processing unit 240 outputs the video signals and audio signals in a compressed format to the storage unit 270 or the interface 260.

The video output unit 243 displays video output from the video/audio processing unit 240 on a display, or outputs the video to an external device connected through an external output terminal (for example, an external display).

The audio output unit 246 outputs audio output from the video/audio processing unit 240 through a speaker, or outputs the audio to an external device connected through an external output terminal (for example, an external speaker).

The interface 260 connects the TV 200 to the Internet 150, and transmits a video telephony request signal to the receiving TV 100. In addition, the interface 260 receives results of the video telephony request from the receiving TV 100.

An interface (not shown) of the receiving TV 100 receives the video telephony request signal from the TV 200, and transmits a reply to the received request to the TV 200.

The storage unit 270 stores broadcast data received from the broadcast receiving unit 210, video captured by the video capturing unit 220, and audio data input through the microphone 230, and outputs the stored video and audio data to the video/audio processing unit 240. The storage unit 270 may be implemented as a hard disk or a non-volatile memory.

The storage unit 270 stores a telephone directory of the TV 200. However, the telephone directory of the TV 200 does not have to be stored in the storage unit 270, and may be stored in a server through a messenger (for example, a VoIP messenger) service provided from a phone providing company.

The remote control 280 receives user commands from the user and transmits the commands to the TV 200. In addition, the user can select a recipient for video telephony on the telephone directory using the remote control 280.

The control unit 250 determines user commands received from the remote control 280, and controls the overall operation of the TV 200 accordingly.

In particular, the control unit 250 operates the TV 200 to receive a telephone directory of an external device connected through the interface 260, and updates the telephone directory of the TV 200 based on the received telephone directory.

In addition, the control unit 250 operates the TV 200 to transmit a call request signal to a cell phone of a user of the receiving TV 100 when the receiving TV 100 is turned off.

Moreover, the control unit 250 determines whether or not audio signals are transmitted and received while video telephony is in operation, and then changes the video telephony mode according to whether or not audio signals are transmitted and received.

Furthermore, the control unit 250 receives a command to collectively minimize a plurality of video telephony windows displayed on the screen through the remote control 280, and operates the TV 200 to collectively minimize the plurality of windows.

The control unit 250 operates the TV 200 to adjust the volume of the plurality of video telephony windows individually.

Figure 3:
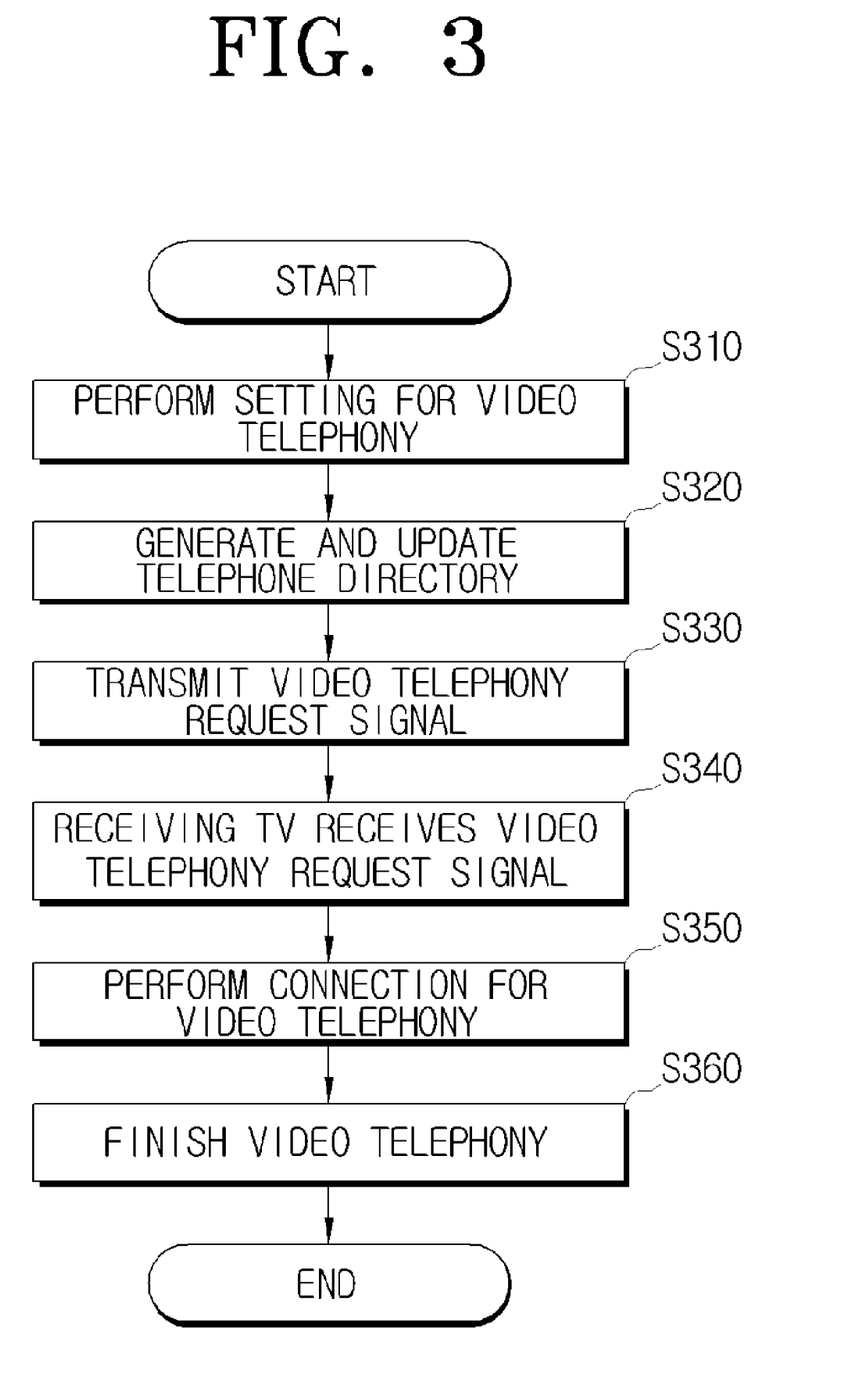
FIG. 3 is a flow chart illustrating a video telephony process using a TV according to an exemplary embodiment of the present invention.

Hereinafter, a process of performing video telephony according to the operation of the control unit 250 as described above is described. FIG. 3 is a flow chart illustrating a video telephony process using a TV according to an exemplary embodiment of the present invention.

As shown in FIG. 3, the control unit 250 adjusts the settings of the TV 200 for video telephony in order for the TV 200 to support video telephony (S310).

For example, the control unit 250 operates the TV 200 to display whether or not there are problems with the microphone 230 or the video capturing unit 220 using icons on the screen. The control unit 250 operates the video capturing unit 220 to begin capturing video of the user even before performing video telephony.

In addition, if the video capturing unit 220 is embedded in the TV 200, the control unit 250 operates the video capturing unit 220 to appear outside and open a cover of the video capturing unit 220.

Subsequently, the control unit 250 generates or updates a telephone directory (S320). The control unit 250 may read out the telephone directory of the TV 200 stored in the storage unit 270, or may operate the TV 200 to download the telephone directory stored in a server of a phone providing company through the interface 260. The phone providing company provides the TV 200 with the telephone directory using the VoIP messenger over the Internet. Accordingly, the TV 200 can download the telephone directory stored in the server using the VoIP messenger.

For video telephony between a TV and a TV, or a TV and a PC, the control unit 250 makes the user search for a recipient to communicate with using an instant messenger. For example, the control unit 250 permits the user select one friend from a friend list stored in the VoIP messenger and send a request video telephony request to the selected friend. In addition, the control unit 250 may permit the user to search for a recipient for video telephony using the recipient's name, user identification (ID), or telephone number.

For video telephony between a TV and a wired phone, or a TV and a mobile phone, a separate telephone directory may be stored in the storage unit 270 or an external storage unit.

In addition, the control unit 250 can update the telephone directory by receiving telephone numbers from a mobile phone. This process will be described with reference to FIGS. 4 and 9.

Subsequently, the control unit 250 transmits a video telephony request signal to a receiving TV 100 selected by the user (S330). In greater detail, in order to request video telephony, the user directly inputs the telephone number of the receiving TV 100 using the remote control 280, or selects the recipient from the telephone directory of the TV 200. The TV 200 may send a video telephony request to a wired phone or a mobile phone as well as another TV or a computer.

In addition, when sending a video telephony request to the receiving TV 200, the control unit 250 receives from the receiving TV 100 information regarding whether or not there are any problems with a microphone and camera of the receiving TV 100. That is, the control unit 250 determines the state of the microphone and the camera of the receiving TV 100 upon sending the video telephony request.

Subsequently, the receiving TV 100 receives the video telephony request signal from the TV 200 (S340). A screen of the receiving TV 100 may show a message indicating that video telephony is requested, or a video message transmitted from the TV 200.

If the receiving TV 100 is busy, the receiving TV 100 may transmit a message to the TV 200 indicating that the line is busy. The message indicating the line is busy may be in text form or image form.

Figure 5:
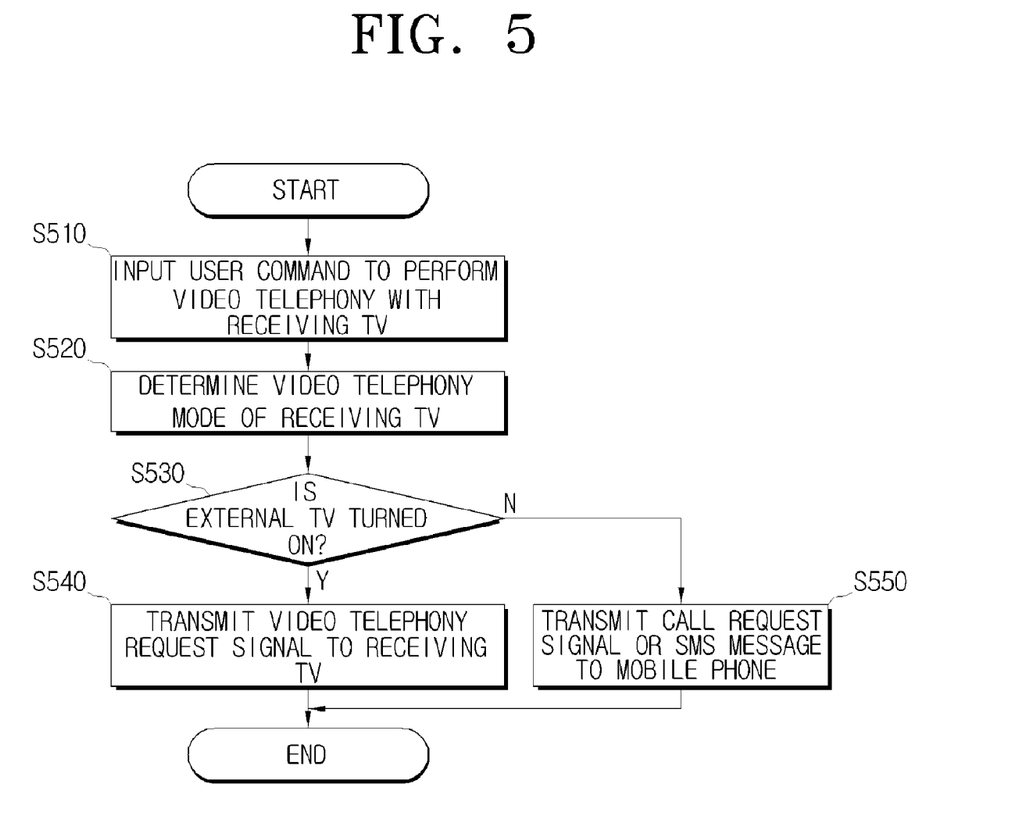
FIG. 5 is a flow chart illustrating a process of transmitting a call request signal to a mobile phone when a receiving TV is turned off according to a second exemplary embodiment of the present invention.

A situation in which the receiving TV 100 is turned off will be described below with reference to FIGS. 5 and 10.

Subsequently, if the receiving TV 100 accepts video telephony, the TV 200 is connected to the receiving TV 100, and performs video telephony (S350).

During video telephony, the control unit 250 displays a video telephony window as well as a TV program window on the screen of the TV 200. The TV program window is a window for displaying a TV program, and is usually set to full-screen mode. The video telephony window is a window for displaying information regarding video telephony, and so displays video captured by the camera of the receiving TV 100. In addition, the video telephony window may further include the recipient's name, telephone number, and user ID.

If the recipient uses a device without a camera (for example, a wired phone), the control unit 250 operates the TV 200 to display a preset image on the video telephony window of the TV 200. The preset image may be an image which is preset in the TV 200, or an image which is preset in the receiving TV 100.

Even if the recipient uses a device with a camera, the control unit 250 may operate the TV 200 to display a preset image on the video telephony window of the TV 200.

If the camera of the receiving TV 100 has an aspect ratio which differs from the aspect ratio of the TV 200, the control unit 250 may control the TV 200 to display images in the aspect ratio of the camera of the receiving TV 100. For example, if the aspect ratio of the TV 200 is 16:9 and the aspect ratio of the camera of the receiving TV 100 is 3:4, a video telephony screen can be implemented to be displayed in the aspect ratio of 3:4 on the video telephony window of the TV 200.

The control unit 250 can adjust the size of the video telephony window according to user manipulation. In the situation that video telephony is performed between a plurality of people, the control unit 250 may display a plurality of video telephony windows on the screen.

The control unit 250 may adjust the position and size of respective video telephony windows.

If transmission and reception of audio signals are suspended for a period of time, the control unit 250 switches TV 200 to a video telephony stand-by mode. This process will be described below with reference to FIGS. 6 and 11.

Figure 7:
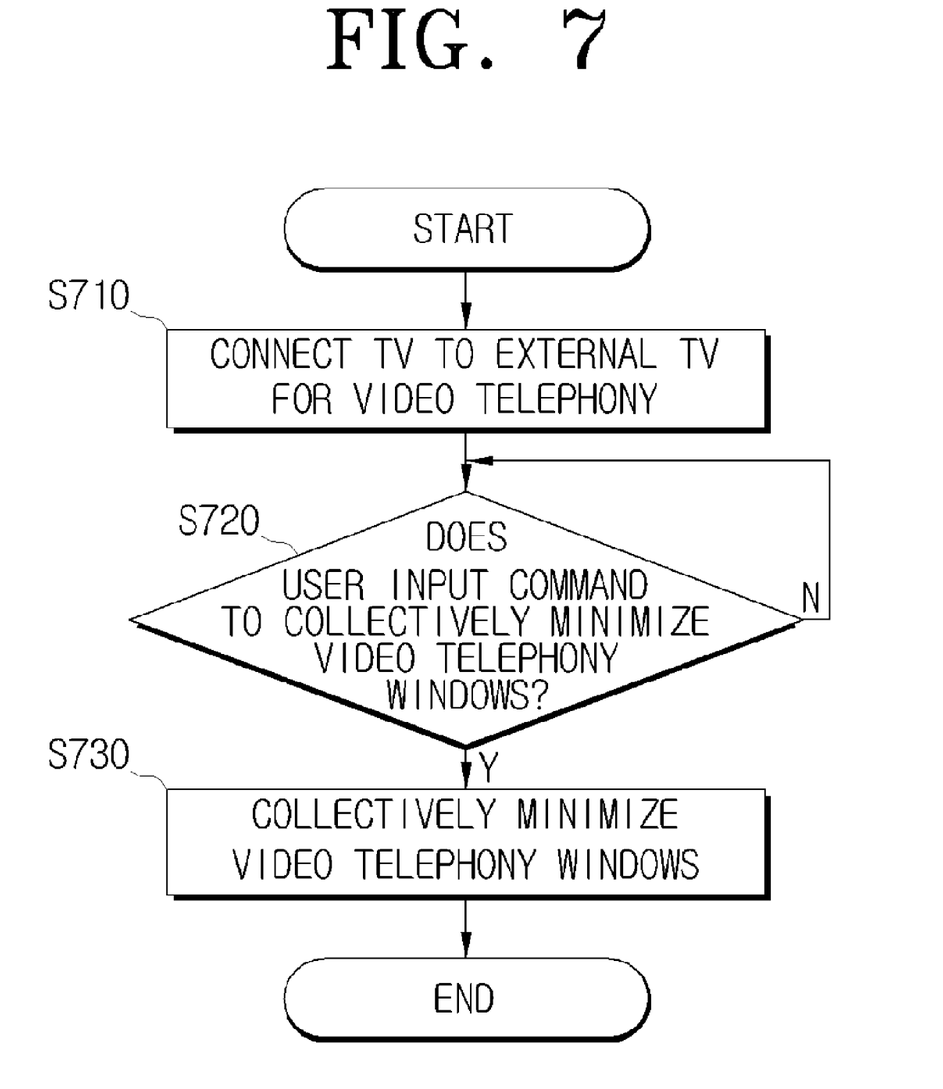
FIG. 7 is a flow chart illustrating a process of collectively minimizing video telephony windows according to a fourth exemplary embodiment of the present invention.

The process of collectively minimizing the plurality of video telephony windows according to a user command will be described below with reference to FIG. 7.

The control unit 250 adjusts the volume of each of the plurality of video telephony windows. This process will be described below with reference to FIGS. 8 and 12.

The control unit 250 stores video data and audio data for video telephony in the storage unit 270. If the recipient refuses storage of the video data, the control unit 250 may store only audio data. In addition, the control unit 250 may also automatically store the date when the video telephony is performed, the duration of the video telephony, and the name of the recipient as tag information.

The control unit 250 operates the video capturing unit 220 to track and capture video of the user's face by detecting the position of the user's face during video telephony. For example, if the video capturing unit 220 is a face recognition camera, the control unit 250 receives face recognition information from the camera, and thereby can operate the video capturing unit 220 to track and capture video of the user's face. In addition, the control unit 250 can also operate the video capturing unit 220 to track and capture video of the user's face by receiving information regarding the position of the face from a position detection sensor which is mounted in the video capturing unit 220.

If a command to finish video telephony is input, the control unit 250 finishes video telephony (S360).

The process of performing video telephony according to the exemplary embodiment of the present invention has been described with reference to FIG. 3.

Figure 4:
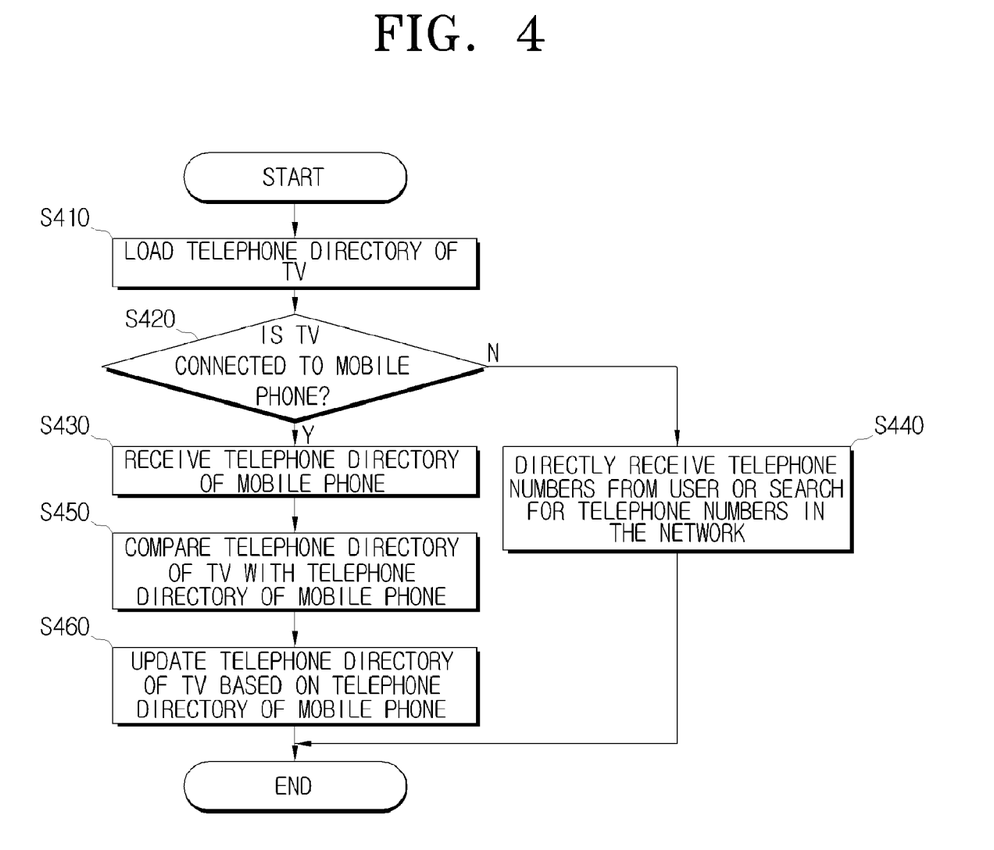
FIG. 4 is a flow chart illustrating a process of updating a telephone directory in a TV according to a first exemplary embodiment of the present invention.

Hereinafter, a process of updating a telephone directory of a TV is described in detail with reference to FIGS. 4 and 9. FIG. 4 is a flow chart illustrating a process of updating a telephone directory in a TV according to a first exemplary embodiment of the present invention.

As shown in FIG. 4, the TV 200 loads a telephone directory of the TV 200 (S410). The telephone directory of the TV 200 may be stored in the storage unit 270, or in a server of a telephone providing company (for example, a VoIP messenger server).

The telephone directory includes names and telephone numbers, but other information may also be included. For example, telephone numbers may be classified in groups in the telephone directory, and birth dates, and addresses may also be recorded.

Subsequently, the control unit 250 determines whether or not the TV 200 is connected to a mobile phone (S420). The TV 200 may be connected to the mobile phone through a wireless Internet network or wireless network (for example, Wireless Internet Platform for Interoperability (WIPI) or Bluetooth). In addition, the TV 200 may also be connected to the mobile phone using infrared transmission or a wired line.

If the TV 200 is not connected to the mobile phone (S420-N), the control unit 250 updates the telephone directory by directly receiving telephone numbers from the user or by searching for telephone numbers in the network (S440).

If the TV 200 is connected to the mobile phone (S420-Y), the control unit 250 receives the telephone directory stored in the mobile phone (S430), and then compares the telephone directory of the TV 200 with the telephone directory of the mobile phone (S450).

Subsequently, the telephone directory of the TV 200 is updated based on the telephone directory of the mobile phone (S460). That is, the control unit 250 extracts telephone numbers which do not overlap between the telephone directory of the TV 200 and the telephone directory of the mobile phone. The control unit 250 then stores in the telephone directory of the TV 200 telephone numbers which are stored in the telephone directory of the mobile phone but not stored in the telephone directory of the TV 200. As a result, the telephone numbers stored in the telephone directory of the mobile phone are moved to the telephone directory of the TV 200.

Following this process, the telephone directory of the TV 200 is updated. FIG. 9 is a drawing illustrating an example of a process of updating a telephone directory of a TV according to the first exemplary embodiment of the present invention.

Figure 9:
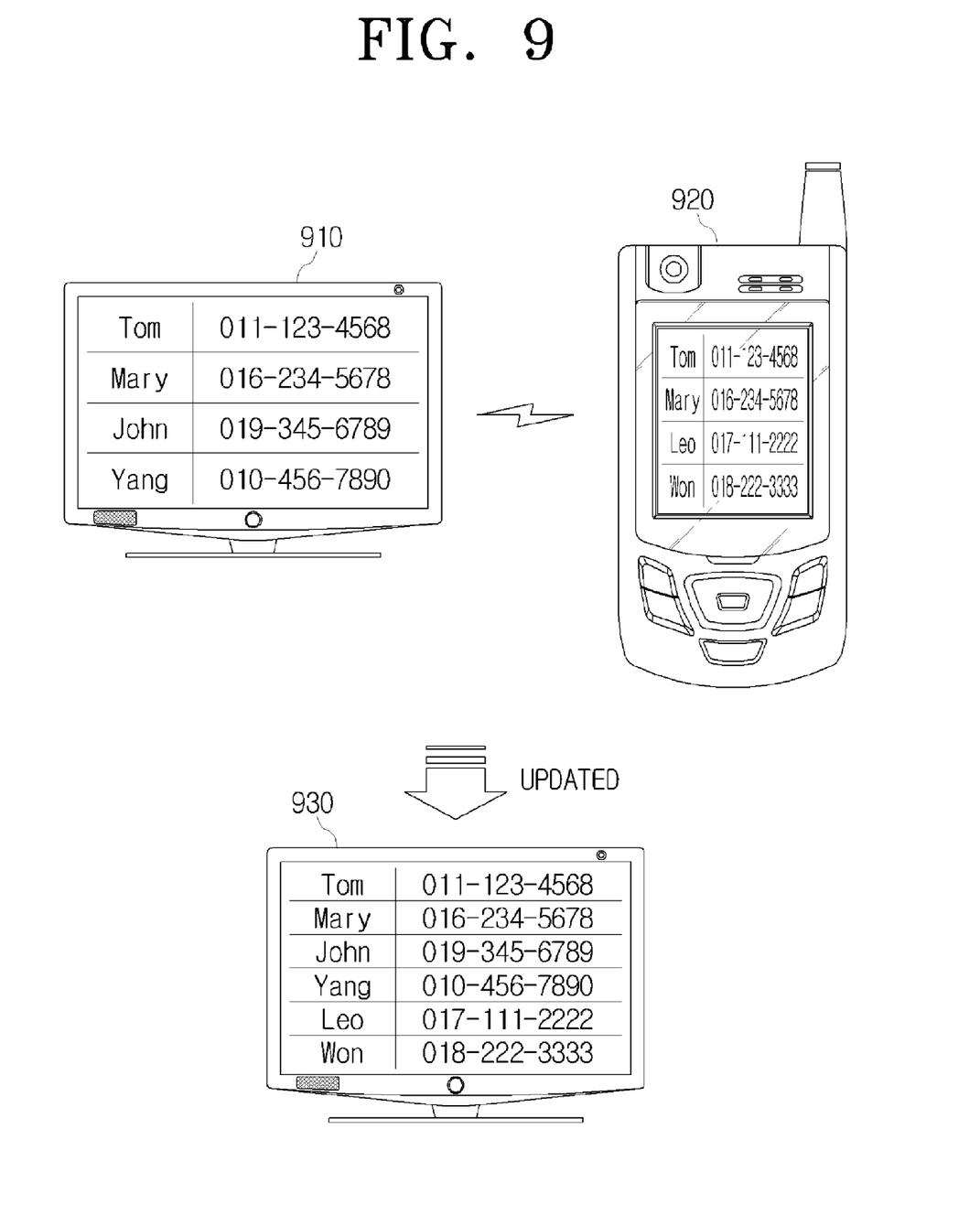
FIG. 9 is a drawing illustrating an example of a process of updating a telephone directory of a TV according to the first exemplary embodiment of the present invention.

In FIG. 9, a telephone directory 910 of a TV and a telephone directory 920 of a mobile phone, which have not yet been updated, are shown. Before updating, the telephone directory 910 of the TV includes telephones numbers of Tom, Mary, John, and Yang, and the telephone directory 920 of the mobile phone includes telephones numbers of Tom, Mary, Leo, and Won. The telephones numbers of Tom and Mary are present in both telephone directories 910 and 920, and the telephones numbers of Leo and Won are stored in the mobile phone but not in the TV. Therefore, if the telephone directory 910 of the TV is updated based on the telephone directory 920 of the mobile phone, the telephones numbers of Leo and Won are added to the telephone directory 910 of the TV.

The telephone directory 930 of the TV after updating includes the telephones numbers of Tom, Mary, John, Yang, Leo, and Won.

As described above, the user can easily and conveniently update the telephone directory of the TV using the telephone directory of the mobile phone.

The process of updating the telephone directory of the TV based on the telephone directory of the mobile phone has been described.

In this exemplary embodiment, a device connected to the TV is a mobile phone. However, the technical idea of this exemplary embodiment can be applied to any kind of device in which a telephone directory is stored. For example, the telephone directory of the TV can be updated using a telephone directory stored in a personal digital assistant (PDA) or an electronic scheduler.

The operation of the control unit 250 of a transmitting TV 1010 (hereinafter "TV 1010") when a receiving TV 1020 (hereinafter "TV 1020") is turned off is described with reference to FIGS. 5 and 10. FIG. 5 is a flow chart illustrating a process of transmitting a call request signal to a mobile phone 1030 when a TV 1020 is turned off according to a second exemplary embodiment of the present invention.

Firstly, the user of TV 1010 inputs a command to perform video telephony with the TV 1020 through the remote control 280 (S510). The control unit 250 determines the state of the TV 1020 (S520). If the TV 1020 is turned on (S530-Y), the control unit 250 transmits a video telephony request signal to the TV 1020 (S540).

If the TV 1020 is turned off (S530-N), the control unit 250 transmits a call request signal to a mobile phone 1030 of the user of the TV 1020, or transmits a text message indicating there is a video telephony request, such as a short message service (SMS) message, to the mobile phone 1030 of the user of the TV 1020 (S550).

Accordingly, even if the TV 1020 is turned off, the user of TV 1010 can communicate with the user of the TV 1020 using the mobile phone 1030 of the recipient, or can send an SMS message to the mobile phone 1030 of the recipient, so the user of TV 1010 can utilize video telephony more conveniently.

The process described above is described below with reference to FIG. 10. FIG. 10 is a drawing illustrating an example of the process of transmitting a call request signal to a mobile phone 1030 when a TV 1020 is turned off according to the second exemplary embodiment of the present invention.

Figure 10:
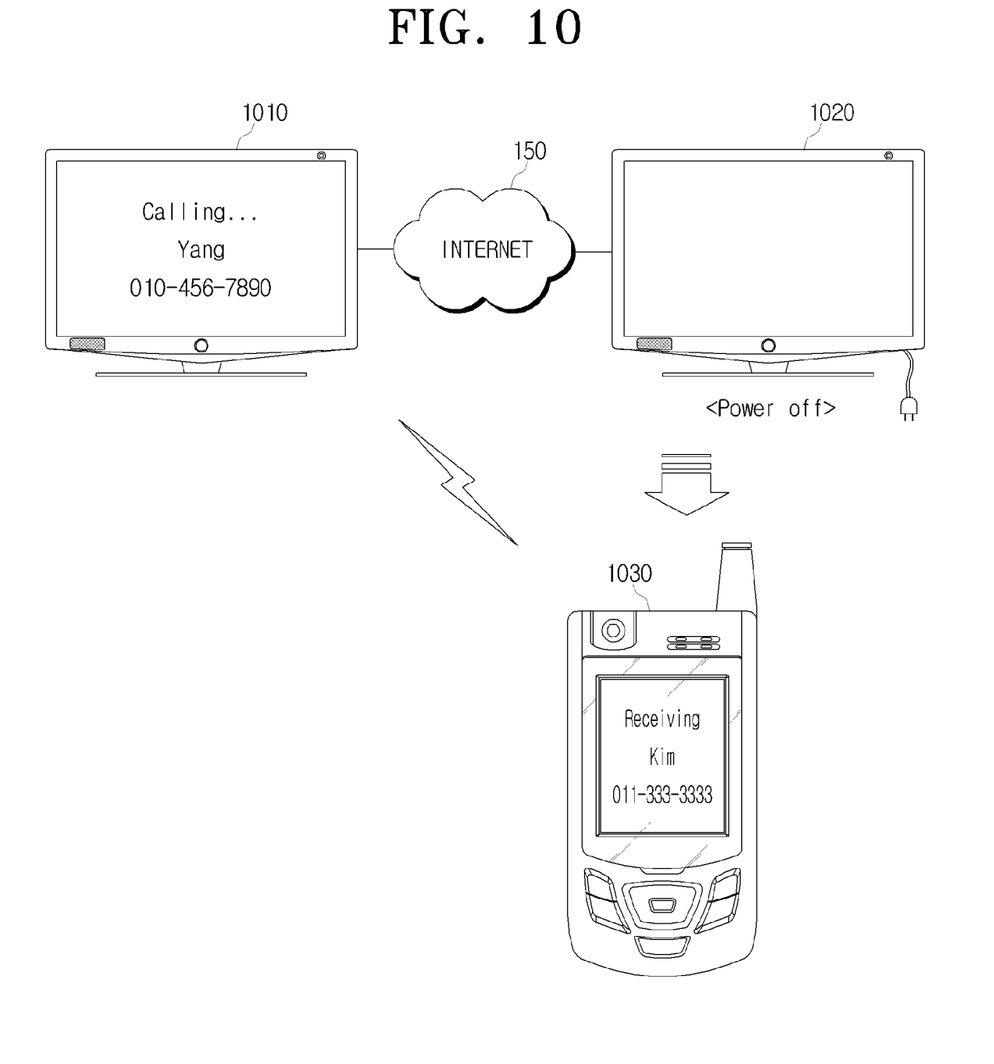
FIG. 10 is a drawing illustrating an example of a process of transmitting a call request signal to a mobile phone when a receiving TV is turned off according to the second exemplary embodiment of the present invention.

As shown in FIG. 10, the user of TV 1010 sends a video telephony request to Yang using the TV 1010. However, the TV 1020 is turned off, so the user cannot perform video telephony with the TV 1020.

Accordingly, the control unit 250 transmits a call request signal to mobile phone 1030 belonging to Yang, who is a user of the TV 1020. If the mobile phone 1030 has a video telephony function, the control unit 250 can perform video telephony with the mobile phone 1030. If the mobile phone 1030 does not support video telephony, the control unit 250 can perform audio telephony with the mobile phone 1030.

As a result, the user can communicate with the user of the TV 1020 even when the TV 1020 is turned off, so the user can perform video telephony using the TV 1010 more conveniently.

Figure 6:
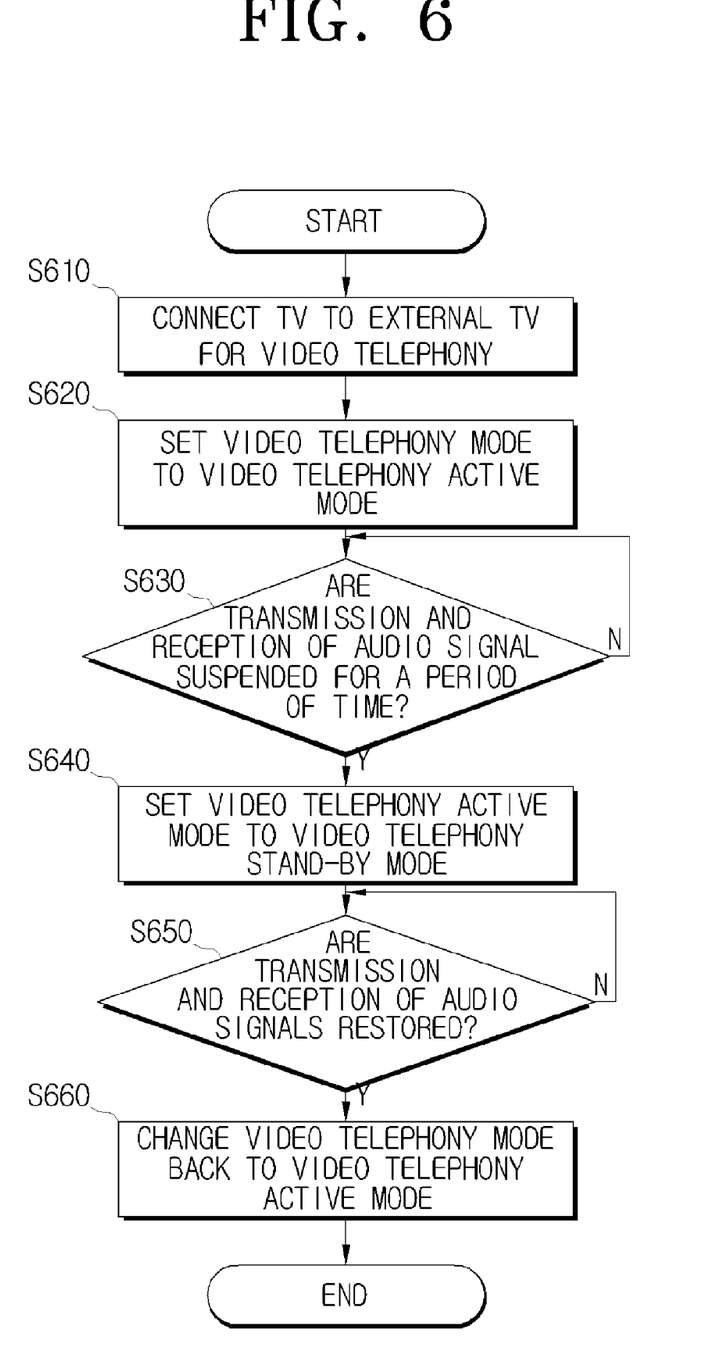
FIG. 6 is a flow chart illustrating a situation in which transmission and reception of audio signals between a TV and an external TV are suspended for a certain period of time according to a third exemplary embodiment of the present invention.

Hereinafter, a situation in which transmission and reception of audio signals between a TV and an external TV are suspended for a period of time is described with reference to FIGS. 6 and 11. The TV and the external TV can each be either receiving TV 100 or transmitting TV 200. FIG. 6 is a flow chart illustrating a situation in which transmission and reception of audio signals between a TV and an external TV are suspended for a period of time according to a third exemplary embodiment of the present invention.

The control unit 250 connects the TV to the external TV for video telephony (S610). If video telephony with the external TV is initiated, the control unit 250 switches the TV to a video telephony active mode (S620). The video telephony active mode is a mode in which the user is provided with an optimal communication environment while performing video telephony. For example, in the video telephony active mode, the control unit 250 can set a video telephony window to full-screen mode, and set the volume to the maximum level.

Subsequently, the control unit 250 determines whether or not transmission and reception of audio signals between the TV and the external TV are suspended for a period of time (S630). If transmission and reception of audio signals continue (S630-N), the video telephony active mode is maintained.

If transmission and reception of audio signals are suspended for a period of time (S630-Y), the video telephony active mode is changed to a video telephony stand-by mode (S640). That is, suspension of transmission and reception of audio signals for a period of time means the phone call between the users is suspended, so the video telephony mode is changed to the video telephony stand-by mode.

In the video telephony stand-by mode, video telephony is not performed, although connection for video telephony is maintained, so functions for video telephony are minimized. For example, in the video telephony stand-by mode, the control unit 250 may minimize the video telephony window, or make the video telephony window appear transparent. In addition, in the video telephony stand-by mode, the control unit 250 may minimize the volume of video telephony, or disconnect video telephony.

Next, the control unit 250 determines whether or not transmission and reception of audio signals are restored (S650). If transmission and reception of audio signals remain suspended (S650-N), the control unit 250 maintains the video telephony stand-by mode.

If transmission and reception of audio signals are restored (S650-Y), the control unit 250 adjusts the video telephony mode of the TV to the video telephony active mode (S660).

Hereinafter, the process described above is described with reference to FIG. 11. FIG. 11 is a drawing illustrating a situation in which transmission and reception of audio signals between a TV (shown) and an external TV (not shown) are suspended for a period of time according to the third exemplary embodiment of the present invention.

Figure 11:
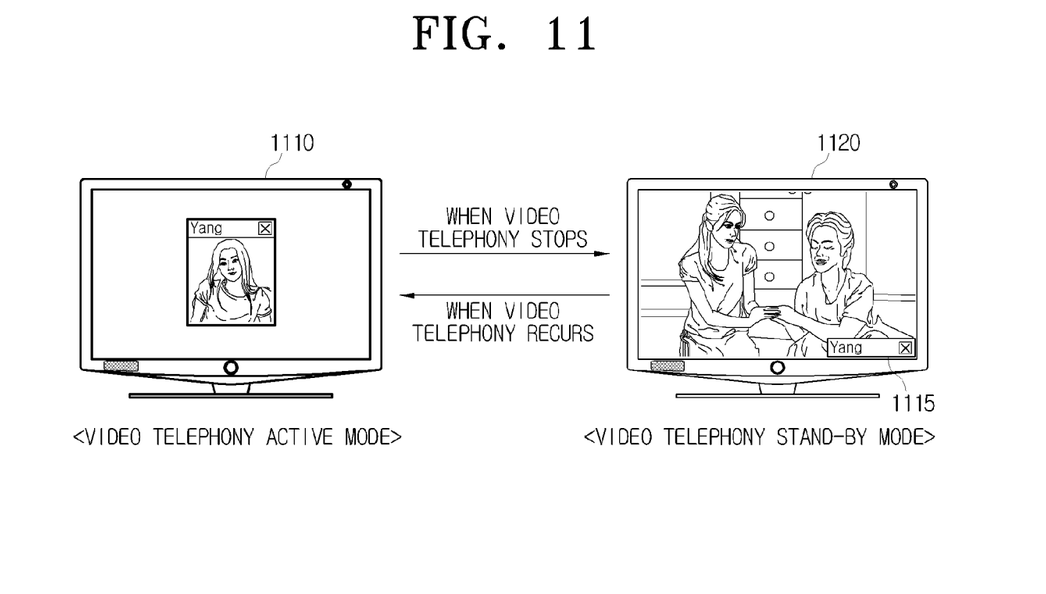
FIG. 11 is a drawing illustrating a situation in which transmission and reception of audio signals between a TV and an external TV are suspended for a period of time according to the third exemplary embodiment of the present invention.

As shown in FIG. 11, in the video telephony active mode 1110, the video telephony window is displayed in the middle of the screen, and the TV program is not displayed. Accordingly, in the video telephony active mode 1110, the user can concentrate on video telephony.

However, if the user suspends video telephony for a period of time (for example, 5 minutes), the TV is changed to the video telephony stand-by mode 1120. In the video telephony stand-by mode 1120, the TV program is displayed, and the video telephony window is minimized. In addition, the control unit 250 can reduce the volume of video telephony to a minimum level, and disconnect video telephony.

If video telephony is restored, the control unit 250 switches the TV to video telephony active mode 1110 again.

Following the above process, the control unit 250 minimizes functions for video telephony when video telephony is suspended, so the user can perform video telephony more conveniently.

Hereinafter, a function for collectively minimizing video telephony windows is described with reference to FIG. 7. FIG. 7 is a flow chart illustrating a process of collectively minimizing video telephony windows according to a fourth exemplary embodiment of the present invention.

The control unit 250 connects the TV to an external TV for video telephony (S710). In this case, the control unit 250 can connect the TV to a plurality of external TVs for video telephony, so a plurality of video telephony windows can be displayed.

If the user inputs a command to collectively minimize the video telephony windows using the remote control 280 (S720-Y), the video telephony windows are collectively minimized (S730). In addition, in this exemplary embodiment, the plurality of video telephony windows are collectively minimized. However, the technical idea of this exemplary embodiment can be applied to other kinds of windows.

That is, the control unit 250 may minimize a plurality of windows in the manner in which the video telephony window 1115 of FIG. 11 is minimized.

The user can thus minimize windows more conveniently by inputting a command to collectively minimize windows.

Figure 8:
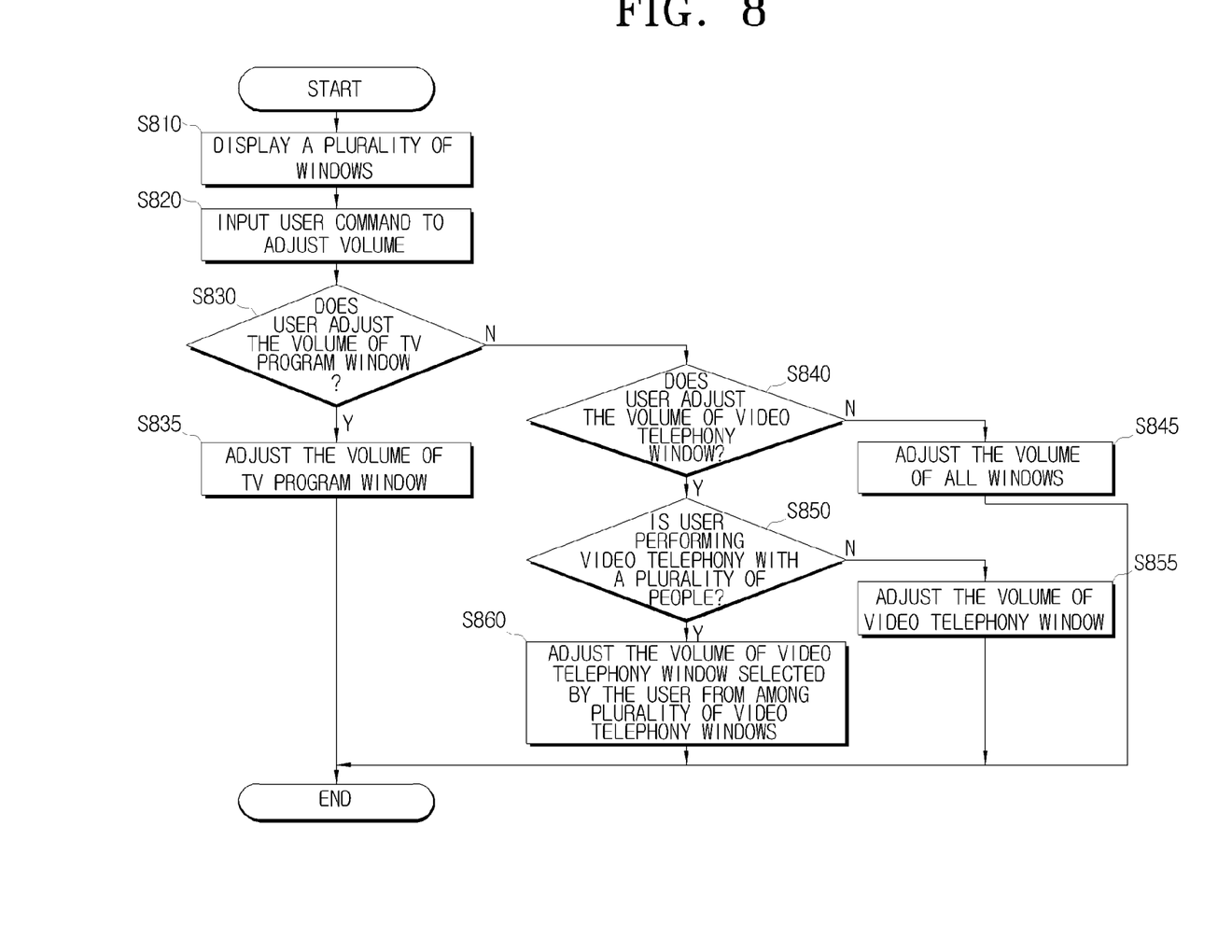
FIG. 8 is a flow chart illustrating a process of adjusting the volume of each of a plurality of video telephony windows according to a fifth exemplary embodiment of the present invention.

Hereinafter, a process of adjusting the volume of a plurality of window is described with reference to FIGS. 8 and 12. FIG. 8 is a flow chart illustrating a process of adjusting the volume of each of a plurality of video telephony windows according to a fifth exemplary embodiment of the present invention.

The control unit 250 displays a plurality of windows for video telephony (S810). For example, during video telephony, a TV program window 1220 and a video telephony window 1210 may be displayed. For video telephony with a plurality of people, a plurality of video telephony windows 1210 may be displayed.

Subsequently, if the user inputs a command to adjust the volume (S820), the control unit 250 determines whether or not the user adjusts the volume of the TV program window 1220 (S830). If the user adjusts the volume of the TV program window 1220 (S830-Y), the control unit 250 adjusts the volume of the TV program window 1220 (S835).

If the user does not adjust the volume of the TV program window 1220 (S830-N), the control unit 250 determines whether or not the user adjusts the volume of the video telephony window 1210 (S840). If the user does not adjust the volume of the video telephony window 1210 (S840-N), the control unit 250 adjusts the volume of all of the windows (S845).

If the user adjusts the volume of the video telephony window 1210 (S840-Y), the control unit 250 determines whether or not the user performs video telephony with a plurality of people (S850). If the user performs video telephony with a plurality of people (S850-Y), the control unit 250 adjusts the volume of a video telephony window selected by the user from among the plurality of video telephony windows (S860).

If the user does not perform video telephony with a plurality of people (S850-N), there is a single video telephony window 1210, so the control unit 250 adjusts the volume of the video telephony window 1210 (S855).

Hereinafter, the process described above is described with reference to FIG. 12. FIG. 12 is a drawing illustrating a process of adjusting the volume of each of a plurality of video telephony windows according to the fifth exemplary embodiment of the present invention.

Figure 12:
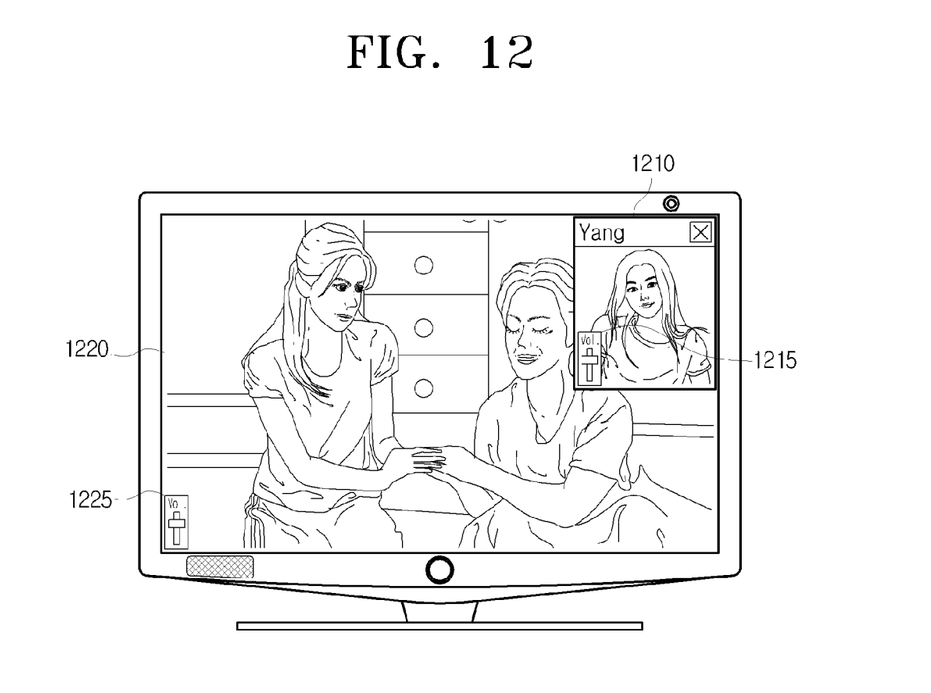
FIG. 12 is a drawing illustrating a process of adjusting the volume of each of a plurality of video telephony windows according to the fifth exemplary embodiment of the present invention.

As shown in FIG. 12, when the user uses video telephony while watching TV, a video telephony window 1210 and a TV program window 1220 are displayed on the screen.

The video telephony window 1210 displays video received by a video telephony receiver, and also a video telephony volume icon 1215 for adjusting the volume of the video telephony window 1210. Accordingly, the user can check the current volume by viewing the video telephony volume icon 1215, and adjust the volume of the video telephony window 1210 by adjusting the video telephony volume icon 1215 using the remote control 280.

The TV program window 1220 is a window for displaying a program broadcast on the TV. In FIG. 12, the TV program window 1220 is displayed in full-screen mode.

In addition, the TV program window 1220 includes a TV program volume icon 1225, so the user can check and adjust the current volume of the TV program window 1220 using the TV program volume icon 1225.

Even if a plurality of windows are displayed on the screen, the user can utilize video telephony by adjusting the volume of a desired window.

A process of adjusting the volume of a plurality of windows respectively has been described with reference to FIGS. 8 and 12.

As can be appreciated from the above description, a video telephony method for updating a telephone directory of a broadcast receiving apparatus by receiving a telephone directory of a connected external device is provided, so that the user can utilize video telephony more conveniently.

A call request signal can be transmitted to an information communication terminal of the user of an external broadcast receiving apparatus when the external broadcast receiving apparatus is turned off, so that users can transmit the call request signal even when the external broadcast receiving apparatus is turned off.

The video telephony mode can change according to whether or not audio signals are transmitted and received when the TV is connected to perform video telephony, so the user can view the TV more conveniently when video telephony is suspended for a period of time.

A plurality of windows can be collectively minimized according to a command received from an input unit to collectively minimize the plurality of windows, so the user can minimize the plurality of video telephony windows at once more conveniently The volume of a plurality of windows can each be adjusted separately so that the user can concentrate on either of the TV program and video telephony windows.

The method according to the exemplary embodiment of the present invention may be implemented as a computer implemented method embodied as computer instructions stored on a computer readable recording medium. The computer readable recording medium may store data that will be read by a computer system in the above-described process. The computer readable recording medium may be a RAM, a ROM, a CD-ROM or an optical data storage device.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing video telephony using a broadcast receiving apparatus, the method comprising:
   receiving by the broadcast receiving apparatus, a user command to perform video telephony with an external broadcast receiving apparatus;
   based on the user command received by the broadcasting apparatus, determining by the broadcast receiving apparatus, whether the external broadcast receiving apparatus is turned on; and
   transmitting by the broadcast receiving apparatus a call request signal or a short message service (SMS) message to an information communication terminal of a user of the external broadcast receiving apparatus if the external broadcast receiving apparatus is turned off.

2. The method of claim 1, wherein the information communication terminal is a mobile phone, and
   wherein the call request signal or a short message service (SMS) message indicates there is a call request to the external broadcast receiving apparatus.

3. A method for providing video telephony using a broadcast receiving apparatus, the method comprising:
   receiving and displaying a broadcast signal;
   stopping the displaying of the broadcast signal and performing the video telephony with an external device according to a predetermined event;
   determining by the broadcast receiving apparatus whether or not audio signals are transmitted and received during video telephony; and
   changing a video telephony mode to a video telephony stand-by mode, if audio signals are not transmitted or received for a period of time,
   wherein the video telephony stand-by mode is a mode to reactivate the displaying of the broadcast signal which was stopped.

4. The method of claim 3, wherein in the video telephony stand-by mode, windows connected with video telephony are reduced or become transparent.

5. The method of claim 3, wherein in the video telephony stand-by mode, the volume of the calls connected with video telephony are reduced.

6. The method of claim 3, wherein in the changing operation, if transmission and reception of the audio signal are restored, the video telephony mode is changed back to a video telephony active mode.

7. The method according to claim 3, further comprising:
   receiving a user command to collectively minimize a plurality of windows displayed on a screen of the broadcast receiving apparatus from an input unit of the broadcast receiving apparatus; and
   minimizing the plurality of windows collectively according to the received user command.

8. The method according to claim 7, wherein the plurality of windows are windows for video telephony.

9. The method according to claim 3, further comprising:
   displaying a plurality of windows; and
   adjusting the volume of the plurality of windows separately.

10. The method according to claim 9, wherein the plurality of windows comprise a window for a broadcast program, and a window for video telephony, and
    wherein the adjusting operation comprises adjusting the volume of the window for the broadcast program and the window for video telephony separately.

11. The method according to claim 9, wherein the plurality of windows comprises a plurality of windows for video telephony, and
    wherein the adjusting operation comprises adjusting the volume of each of the windows for video telephony.

* * * * *